Patented Feb. 23, 1932

1,846,810

UNITED STATES PATENT OFFICE

ROBERT R. LEWIS, OF FREEPORT, AND ALBERT J. WEISS, OF BROOKLYN, NEW YORK, ASSIGNORS TO VULCAN PROOFING COMPANY, OF NEW YORK, N. Y., A CORPORATION OF NEW YORK

MAKE-READY ELEMENT FOR PRINTING PRESSES, AND METHOD OF MAKING THE SAME

No Drawing. Application filed August 6, 1931. Serial No. 555,530.

Our invention relates to a new and improved make-ready element for printing presses, and a new and improved method of making the same.

One of the objects of our invention is to provide an improved oil-resistant make-ready element of superior durability, such as a drawsheet, a top blanket or packing, an under blanket or packing, etc. A make-ready may include one or more of the improved elements, used together with an old-style blanket or blankets, or the make-ready of a press may consist wholly of improved elements made according to our invention.

Another object of our invention is to provide a blanket which shall have superior resistance to embossing or "bolstering" in addition to having superior resistance to inks and oils.

Another object of our invention is to provide a blanket having a yieldable, resilient and durable surface which repels ink, said surface being dry and hard and non-tacky, and being substantially resistant to cracking and peeling.

Another object of our invention is to provide a blanket which is sufficiently strong and flexible to enable it to be stretched around the cylinder of the press and to be bent into the reel-rod slot without breaking or cracking and without excessive stretch.

Another object of our invention is to provide an element of a make-ready, with a layer of material of improved composition for the purposes above described. This composition may be used to impregnate a suitable fabric or other material, or to form a surface coating upon a fabric or other material or in any other suitable manner.

Another object of our invention is to use a plastic material which is not a resin, and which can be heat-treated in order to set it into final form.

Other objects of our invention will be set forth in the following description, it being understood that the above general statement of the objects of our invention is intended to generally explain the same, without limiting it in any manner.

We can utilize a number of plastic compositions which result from interacting polysulfides and additive halogen olefins. These basic compositions can be infinitely varied, by suitably compounding and processing them, in order to vary the properties of the make-ready elements. We prefer to use a composition which is ink-repellent, unaffected by inks, oils or cleaning solvents, which is resilient and which does not emboss, has a hard, dry surface, and ample strength and toughness to withstand even excessive type depression. The improved composition has good aging qualities, and does not lose its desirable properties for a long period of time.

While we do not wish to be limited to the proportions, substances, or method of manufacture set forth herein, a practical example of our invention is as follows:

The following ingredients are used, the proportions being by weight:

| | Parts |
|---|---|
| Reaction plastic | 100 |
| Rubber | 20 |
| Zinc oxide | 10 |
| Carbon black | 25 |
| Di-phenyl guanidine | 0.5 |
| Accelerator, such as mercapto-benzothiazole | 0.2 |
| Sulphur | 0.8 |
| Plasticizer, such as sulphurized Burgundy pitch | 1.0 |
| Stearic acid | 0.5 |
| Paraffin | 0.5 |

The reaction plastic above specified, is an ethylene polysulphide. It does not have the essential properties of a resin, and it noticeably resembles rubber, save that said reaction plastic is not affected by the substances which destroy or injure rubber, such as oils, inks, etc. Upon being subjected to a suitable heat treatment, the reaction plastic does not harden, so that it is different from the condensation resins. The heat treatment changes the physical properties of the reaction plastic so that it will be suitable to mechanically withstand the wear and tear encountered by a make-ready element, although the reaction plastic, before being subjected to this heat treatment is sufficiently resistant to the action of ink, oils, etc. In particular the reaction plastic is not a condensation product.

The reaction plastic may be produced by the reaction between sodium polysulphide and dichlor ethylene, it being understood that other polysulphides may be used, and that other additive halogen compounds of an olefin may be used instead of the dichlor ethylene.

The complete compound made according to the formula previously specified may be prepared on a two-roll mill of the well known type which is commonly used in milling rubber compounds. The process of mixing the ingredients resembles the process of mixing an ordinary rubber compound, but the ingredients have different functions than in a rubber compound.

The polysulphide, such as ethylene polysulphide, is masticated on the mill until it becomes somewhat plastic. The rubber is masticated separately and the reaction plastic and the rubber are then milled together. The di-phenyl-guanidine is then added and thoroughly dispersed throughout the mixture of reaction plastic and rubber. The paraffin, stearic acid and the plasticizer are mixed with the other dry ingredients, and all the ingredients of the formula are then mixed on the mill to form a uniform mixture or compound.

This compound is then applied to a suitable base, such as a sheet of any suitable fabric, by means of a three-roll calender, of the type used for applying a surface layer of rubber to a fabric. The mixture or compound is maintained at a temperature of about 200° F. on the three-roll calender, so that the mixture or compound is plastic, and the mixture or compound is fed between the two upper rolls of the three-roll calender, in order to form a sheet of plastic material of predetermined thickness. The bottom roll of the three-roll calender serves to apply the sheet of plastic material to the fabric base with suitable pressure. It may be noted at this point that a temperature of 100 degrees F. may be maintained in the mill in which the ingredients of the compound are mixed, and that said compound does not calender satisfactorily until it has been heated to a temperature of about 200 degrees F. The surface of the composition is dusted with talc powder as it finally emerges from the calender.

The functions of the various ingredients of the batch are as follows:—

The rubber is not absolutely necessary but it is added to improve the calendering of the reaction plastic. The mercaptobenzo thiazole and the sulfur are added to vulcanize the small amount of rubber during the final heat treatment. The diphenyl guanidine serves as a plasticizer, and the other plasticizer is added in order to additionally plasticize the ethylene polysulfide or other reaction plastic. The stearic acid and paraffin also add to the calendering qualities of the compound. The carbon black increases the strength and toughness of the compound. The zinc oxide is an important ingredient, because it changes the properties of the reaction plastic during the final heat treatment, in a manner which seems to be similar in some respects to the action of sulphur in vulcanizing rubber. That is, the action of the zinc oxide is not to harden the compound, to an extent which would make it brittle. However, the action of the zinc oxide is to make the compound somewhat less tacky and to increase its durability. Hence, while the heating of the reaction plastic may not be absolutely necessary, it is desirable in order to increase the durability of the make-ready element.

The final heat treatment is carried out as follows:

The calendered fabric which has been prepared by the preceding operations is wound on a liner, around a hollow drum. This liner is made of a suitable fabric having a rubber coating provided with a smooth rubber face, and this smooth rubber face is caused to contact with the reaction plastic compound. By winding the calendered fabric and the liner under suitable tension around the drum, the smooth rubber face is caused to press against the reaction plastic and to smooth out any inequalities resulting from the calendering operation. The calendered fabric (or other calendered material) is then tightly bandaged around the drum, and covered with a waterproof cover. This drum is then run into a horizontal steam vulcanizer, of the type used in vulcanizing rubber, and is heated at a temperature of 270° F. to 287° F. for varying periods of time, depending on the size of the blanket which is being prepared and the composition of the reaction plastic compound. For example, if the make-ready element is a wood-felt blanket ten yards long and coated with the ethylene polysulphide compound, and wound in a liner twelve yards long, a temperature of 270° F. would be maintained for two hours. A fifteen yard piece of cotton fabric coated with the same compound and wound in a liner twenty three yards long would be heated for one and one-half hours, at 287° F.

After the completion of the heat treatment, the drum is removed from the vulcanizer and is allowed to cool gradually for a period of 10 to 12 hours, while the blanket or the like, and the liner, are still tightly wrapped around the drum. Hence the pressure on the reaction plastic is maintained during the cooling. This is done in order to eliminate porocity which would otherwise be produced by a gas which is ordinarily generated during the heating operation. The pressure on the reaction plastic restrains the formation of gas to a large extent, and any gas which is formed leaks out of the material through the side thereof, instead of forming pores in the coating material.

A double-faced blanket may be made by applying layers of the reaction plastic to the faces of a suitable base material, such as wool felt, etc. In such case, a double-faced liner may be used and this is preferred. The advantage of using a double-faced liner is that the cloth of the liner cannot leave an impression on one surface coating of the double-faced blanket. If a double-faced blanket is made, the liner may be eliminated, and the double-faced material may be wound directly in the form of a spiral around the drum. However, the use of the liner is preferred as smoother surfaces are formed on the completed blanket.

The reaction plastic may thus be applied directly to one surface, or to both surfaces of the so-called wool felt which is used for making printer's blankets.

The reaction plastic may have particles of various materials, such as cork particles, added thereto in the mixing process, and this mixture may be applied to a surface of a strong woven cotton cloth, in order to form a surface layer or coating. An additional surface coating of said material (having no cork particles) may then be formed over the first mentioned layer (having the cork particles) and the entire combination may then be heated.

The plastic mixture, with or without the particles of cork or other material, may be applied to both surfaces of a woven cotton fabric.

The reaction plastic mixture may be applied to one or both surfaces of a strong paper, and then subjected to the heat treatment. The paper is preferably an impregnated non-absorbent paper.

The reaction plastic mixture may be applied to one surface of a thin woven cotton fabric and this thin cotton fabric may be united by another layer of the reaction plastic mixture, to a heavier woven cotton fabric. The entire combination may then be heated. Likewise, the thin coated cotton fabric may be connected to a woven woolen felt by another layer of the reaction plastic mixture.

The layer of reaction plastic material which units the two pieces of fabric may have cork particles therein.

Where the blanket consists of a plurality of sheets of cloth, some or all of said sheets of cloth could be replaced by paper suitably impregnated with the reaction plastic compound.

Likewise, the reaction plastic mixture could be used as an intermediate layer between two sheets of fabric, in order to form an underpacking element over which any of the preceding combinations could be used as a top packing element.

Where the reaction plastic mixture is used to unite two layers of cloth, cork particles may be added to said mixture.

In order to form an underpacking element, one or both faces of a heavy cotton woven fabric may be coated, with or without the use of cork particles.

The reaction plastic mixture may also be applied to the surface of a strong woven fabric and used as a draw-sheet. It will be noted that the reaction plastic is heated and treated in situ in order to increase its durability.

While a great many other useful variations could be made, an important feature of my invention is the use of a reaction plastic which is not a resin or a condensation product, and which can be calendered and otherwise readily handled. This plastic is resistant to the action of oils, inks, etc. before being subjected to a suitable heat treatment, but this heat treatment is necessary to impart to it the necessary physical properties to withstand the wear and tear of a make ready element. The action of the heat treatment is to increase the resistance of the reaction plastic to oils, inks, or ordinary solvents. Likewise the heat treatment does not harden the plastic, at least to an extent sufficient to make it brittle, and the surface becomes non-tacky as the result of the heat treatment.

In order to specify some of the equivalents which may be used for producing the reaction plastic, it may be noted that the sodium polysulphide may be replaced by other soluble polysulphides such as the polysulphides of potassium, calcium, ammonium or of any of the alkali or alkali earth metals.

Likewise the dichlor ethylene may be replaced by dichlorides or propylene or of higher members of the olefin series. Likewise, the dibromides of the olefins may be used instead of dichlorides. Irrespective of the actual chemical composition of the plastic utilized, said plastic may be defined for the purposes of this specification as being a polymerized substance derived from halogenized unsaturated hydrocarbon in the presence of sulphur.

Whenever we refer to the improved plastic material in the claims, it is to be understood that we include a device in which cork or other material may be incorporated in said plastic material. The layer of reaction-plastic material may have a thickness of .008 to .020 inches.

We have shown preferred embodiments of our invention, but it is to be understood that numerous changes and omissions could be made without departing from its spirit. For example, whenever we refer to a coating or layer of the reaction-plastic, it is to be understood that we include the use of the reaction plastic as an impregnating agent for cloth, paper, etc., and that we do not wish to be limited to the use of any of the additional materials specified herein. Likewise the claims for the article of manufacture are not to be limited to any particular process of manufacture.

We claim:

1. A make-ready element comprising a base having a coating of material, said coating being resilient and resistant to the action of printer's ink, said material being a polymerized material resulting from the reaction of sulphur and a halogenized unsaturated hydrocarbon.

2. A make-ready element comprising a base having a coating of material, said material being substantially non-porous and being resilient and also resistant to the action of printer's ink, said material being a polymerized material resulting from the reaction of sulphur and a halogenized unsaturated hydrocarbon.

3. A make-ready element comprising a plurality of sheets of base material connected by an intermediate resilient layer of substantially non-porous material, at least one of said sheets having a surface coating of said resilient and heat-treated material, said material being a polymerized material resulting from the reaction of sulphur and a halogenized unsaturated hydrocarbon.

4. A make-ready element comprising a base having a resilient coating which is resistant to the action of printer's ink, said coating including vulcanized rubber and a heat-treated ink-resistant material, said material comprising more than fifty per cent of said coating, said material being a polymerized material resulting from the reaction of sulphur and a halogenized unsaturated hydrocarbon.

5. A make-ready element comprising a base having a resilient and ink-resistant coating of material, said material being a reaction product under heat of zinc oxide and of a polymerized material resulting from the reaction of sulphur and a halogenized unsaturated hydrocarbon.

6. A method of forming a make-ready element which consists in applying to a base a plastic material, and then heating said plastic material under pressure, said material being a polymerized material resulting from the reaction of sulphur and a halogenized unsaturated hydrocarbon.

7. A method of forming a make-ready element which consists in applying to a base a plastic material, and then heating said plastic material under pressure, and allowing the heated material to cool under pressure, said material being a polymerized material resulting from the reaction of sulphur and a halogenized unsaturated hydrocarbon.

8. A method of forming a make-ready element which consists in applying to a base a mixture which comprises a major proportion of material and a minor proportion of rubber, said mixture also containing a vulcanizing agent for the rubber in sufficient proportion to only vulcanize the rubber, said mixture also containing zinc oxide, and then heating the base and material under pressure so as to render said mixture resilient and resistant to the action of printer's ink, said material being a polymerized material resulting from the reaction of sulphur and a halogenized unsaturated hydrocarbon.

9. A method of forming a make-ready element which consists in heating a base to which has been applied a material, while permitting evolved gas to escape without rendering said material porous, said material being a polymerized material resulting from the reaction of sulphur and a halogenized unsaturated hydrocarbon.

10. A method of forming a make-ready element which consists in wrapping a base which is coated with a material together with a liner having a smooth face, spirally around a core, so that the coated face of the base is in contact with said smooth face under pressure, and heating the coated material and liner, said material being a polymerized material resulting from the reaction of sulphur and a halogenized unsaturated hydrocarbon.

11. A method of forming a make-ready element which consists in heating a base to which has been applied a material, while said base is in the form of a tightly wound spiral, said material being a polymerized material resulting from the reaction of sulphur and a halogenized unsaturated hydrocarbon.

12. A method of forming a make-ready element which consists in heating a material until it becomes plastic, the temperature of said heating operation being below the temperature at which said material becomes resilient, applying the heated plastic material to a fabric base, and then heating the plastic material and fabric base at a temperature and for a sufficient period of time to cause said plastic material to become resilient, the temperature of the last heating operation being below the point at which the fabric is injured and being above the temperature of the first heating operation, said material being a polymerized material resulting from the reaction of sulphur and a halogenized unsaturated hydrocarbon.

13. A method of forming a make-ready element which consists in heating a material until it becomes plastic, the temperature of said heating operation being below the temperature at which said material becomes resilient, applying the heated plastic material to a fabric base, and then heating the plastic material and fabric base at a temperature and for a sufficient period of time to cause said plastic material to become resilient, the temperature of the last heating operation being below the point at which the fabric is injured and being above the temperature of the first heating operation, said plastic material being subjected to pressure during said second heating operation, said material being a polymerized material resulting from the reaction of sulphur and a halogenized unsaturated hydrocarbon.

14. A method of forming a make-ready element which consists in heating a material until it becomes plastic, the temperature of said heating operation being below the temperature at which said material becomes resilient, applying the heated plastic material to a fabric base, and then heating the plastic material and fabric base at a temperature and for a sufficient period of time to cause said plastic material to become resilient, the temperature of the last heating operation being below the point at which the fabric is injured and being above the temperature of the first heating operation, said plastic material being subjected to pressure during said second heating operation, said pressure being maintained while the make-ready element is allowed to cool subsequent to the last heating operation, said material being a polymerized material resulting from the reaction of sulphur and a halogenized unsaturated hydrocarbon.

In testimony whereof we affix our signatures.

ROBERT R. LEWIS.
ALBERT J. WEISS.